United States Patent [19]
Bates et al.

[11] Patent Number: 4,724,866
[45] Date of Patent: Feb. 16, 1988

[54] SPEED CONTROL VALVE

[75] Inventors: Howard J. Bates, Yorba Linda; Willard D. Childs, Encinitas; Eugene S. Matsuda, Laguna Hills; Douglas W. J. Nayler, Mission Viejo, all of Calif.

[73] Assignee: NL Industries, Inc., New York, N.Y.

[21] Appl. No.: 891,748

[22] Filed: Jul. 31, 1986

[51] Int. Cl.⁴ .................................................. F16K 15/06
[52] U.S. Cl. .................................... 137/498; 137/504; 137/514.7
[58] Field of Search ................ 137/498, 501, 504, 514, 137/514.5, 514.7, 517

[56] References Cited

U.S. PATENT DOCUMENTS

| 2,318,963 | 5/1943 | Parker | 137/514.7 |
| 2,583,295 | 1/1952 | Greer | 137/514.7 X |
| 3,741,241 | 6/1973 | Jackson | 137/504 |

FOREIGN PATENT DOCUMENTS 2736076  2/1979  Fed. Rep. of Germany ...... 137/514

*Primary Examiner*—Robert G. Nilson
*Attorney, Agent, or Firm*—Browning, Bushman, Zamecki & Anderson

[57] ABSTRACT

A speed control valve is formed with a pair of cooperating inversely operating dashpots to control movement of a valve element in either direction so as to prevent sudden actuation upon change in fluid velocity or oscillation due to fluid flow changes. Bleeding of fluid into and out of the dashpots controls the speed of movement of the valve element.

12 Claims, 6 Drawing Figures

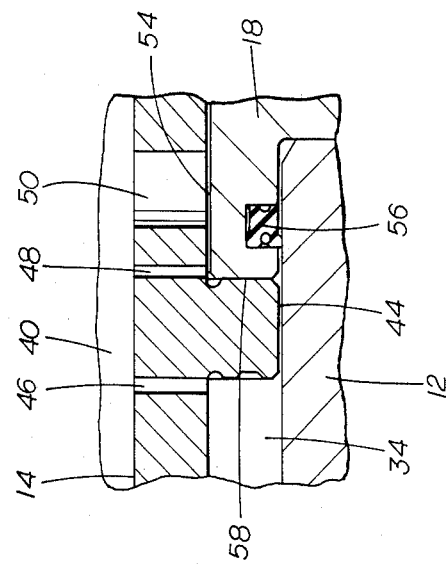
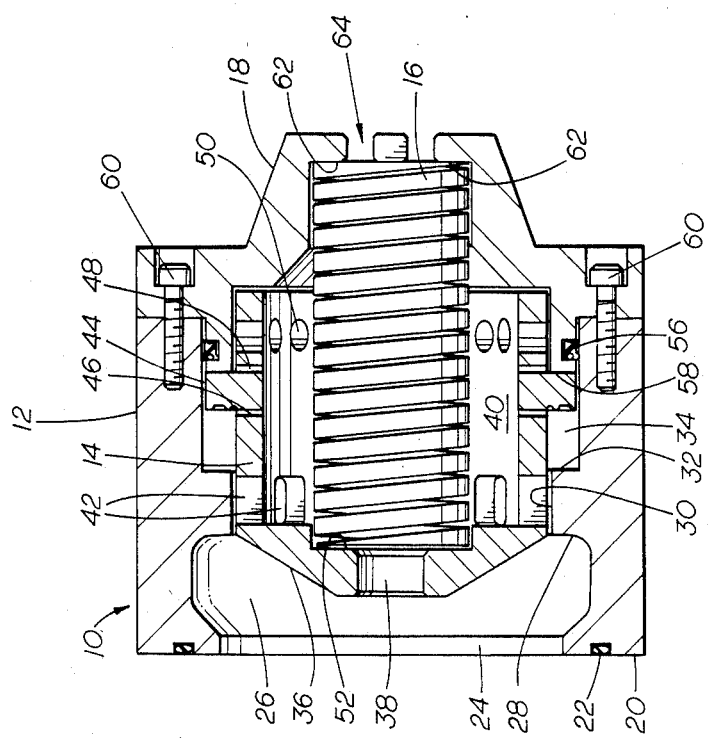

SPEED CONTROL VALVE

BACKGROUND OF THE INVENTION

1. Field of the Invention

The present invention relates to a speed control valve and in particular to a valve in which the operation is dampened so as to prevent sudden changes in flow rate and undesired oscillations.

2. The Prior Art

The use of speed control valves in hydraulic systems is well known in the prior art. However, the main drawback in the known valves is that the great speed in which they react to a change in fluid velocity may lead to their own self-destruction, due to the high impact created when the valve changes condition. When there is a sudden change in the velocity of the fluid passing through the valve, there is an almost immediate reaction with the valve changing condition. Thus, the valve may be actuated at an unwanted time by a momentary change and in so doing set up an undesired pattern of oscillations in the system.

The present invention overcomes the difficulties in the prior art by providing dampening of the movable valve element in either direction so that momentary fluid velocity changes will not trigger the valve and that operation will be controlled in such manner as to prevent damage to the valve itself.

SUMMARY OF THE INVENTION

The present invention is a control valve assembly formed by a body, a piston, a spring and a retainer which together form a speed valve operative between two positions.

The body defines a fluid passage having a first chamber and a second chamber separated by an annular constriction. The piston is a generally cylindrical member having a central orifice opening in a profiled upstream face, a plurality of radial ports surrounding the face, an outwardly directed annular flange intermediate the piston, and a plurality of bleed ports adjacent the flange. The piston is movably received in the body with the flange, annular constriction, second chamber and retainer, which is received in the open end of the second chamber, forming a pair of inversely proportional dashpots controlling the speed of operation of the valve. The spring is received between the piston and retainer to bias the valve to a first condition.

The movement of the piston between these positions, in either direction, is controlled by the dashpots so that the piston is not responsive to momentary pressure differentials, thereby preventing oscillations from occurring in either the opening or closing directions, and when actuated the speed of movement of the piston is such as to prevent damage to it, the body or the retainer.

BRIEF DESRIPTION OF THE DRAWINGS

The present invention will now be described by way of example with reference to the accompanying drawings in which:

FIG. 3 is a section similar to FIG. 1 showing the subject valve in a second condition;

FIG. 4 is a detailed section, on an enlarged scale, of the valve in the second condition of FIG. 3;

DETAILED DESCRIPTION OF THE PREFERRED EMBODIMENT

Figures 1, 2:
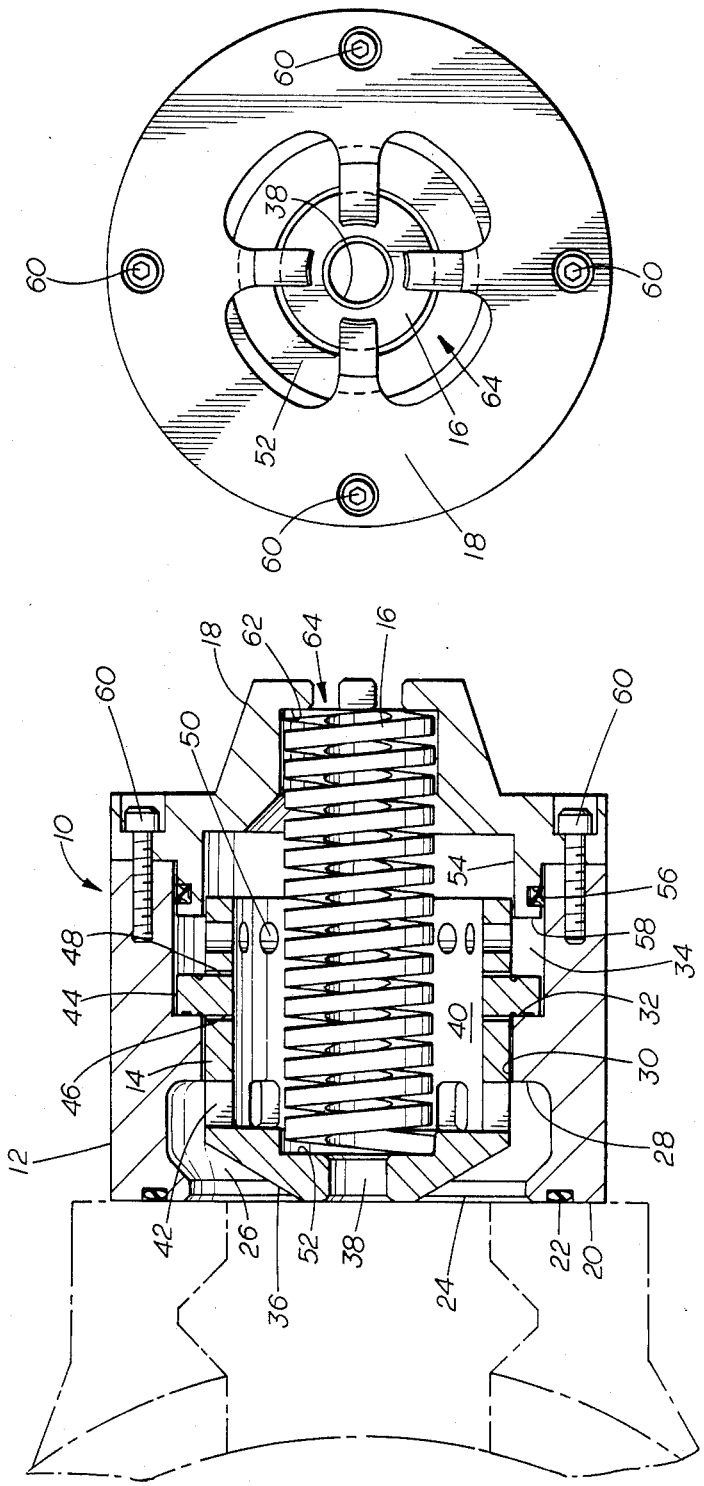
FIG. 1 is a longitudinal section through the speed control valve of the present invention shown in a first condition.
FIG. 2 is an end view of the subject speed control valve.

A preferred embodiment of the subject speed control valve 10 is shown in FIGS. 1-4 formed of four major components, namely a body 12, a poppet or piston 14, a spring 16 and a retainer 18. The body 12 is a generally cylindrical member having a mating face 20 provided with sealing means 22 and defining an entry port 24 leading to a first chamber 26. An annular restriction 28 defines an annular passage 30 which receives the piston 14 therein. The restriction 28 also forms an abutment 32 and defines a second chamber 34.

The poppet or piston 14 is a generally cylindrical member having a flow deflecting face 36 defining a central orifice 38 opening onto an axial chamber 40. The face 36 is surrounded by a plurality of radial ports 42 opening into chamber 40. An integral annular outwardly extending flange 44 is spaced intermediate the length of the piston and a plurality of passages 46, 48 are adjacent opposite sides thereof leading to the chamber 40. The piston 14 also has a plurality of bleed ports 50 and a spring seat 52.

The retainer 18 is a generally annular member having an axially directed cylindrical portion 54 with outwardly directed sealing means 56 received in the end of body 12 to close the chamber 34. The end face 58 of portion 54, together with abutment 32 and the flange 44 on the piston 14, form a pair of cooperating, inversely proportional dashpots to either side of the flange 44. The retainer 18 is secured to the body 12 by conventional means 60 and defines both a spring seat 62 and a central passage 64.

The spring 16 is shown as a conventional helical compression spring, the opposite ends of which are received in respective seats 52, 62. Other known spring configurations could likewise be used.

In operation, the present invention would be inserted into a hydraulic or other fluid pressure line or equipment indicated only by the broken line schematic to the left of FIG. 1. Clearly, other components would be included assembled to the right of the valve in FIG. 1 to form a closed fluid system. One such system which would particularly benefit from this valve is the hydraulic portion of a drill string compensator.

The valve is shown in FIG. 1 as it would be conditioned for normal operation. In this condition, fluid would be flowing from left to right through the central orifice 38 in the piston 14 as well as through the radial ports 42 into chamber 40. The fluid would be exiting through the central passage 64 in the retainer 18. The fluid flowing through the central orifice 38 and the radial ports 42 of the piston will create a pressure differential as the flow rate increases. Under normal conditions, the spring 16 will hold the poppet/piston 14 in its "open" condition, as shown in FIG. 1. As the fluid flow increases, a point will be reached where the differential in the pressure across the poppet/piston 14 is sufficient to overcome the spring force, and the poppet/piston will start to move to its "closed" condition, namely to the right as shown in FIG. 1 to the position shown in FIG. 3. The closing rate is controlled by the bleed rate of the fluid trapped in the dashpots defined by flange 44, second chamber 34, abutment 32 and end face 58 of the retainer 18. As fluid is bled through ports 50 and passages 48, fluid will be admitted through passages 46 to the left side of the flange 42 until the poppet/piston 14 assumes the "closed" condition shown in FIG. 3. It will be appreciated that in this condition the flow through the valve will be limited by the size of the central orifice 38 as radial ports 42 will be closed by annular restriction 28.

It will be further appreciated that when the fluid flow condition returns to normal that the valve will return to the position shown in FIG. 1. However, this return motion will be damped by the dashpot arrangement bleeding fluid from chamber 34 through passages 46 while admitting fluid through passages 48 and ports 50. Thus, even if there is a sudden drop in fluid pressure on face 36, the spring 16 will not cause the piston 14 to move rapidly thereby creating a surge of fluid through the valve or flutter of the piston in opening to cause undesired pulsations of the fluid in the system.

The rate at which the piston 14 moves to its "open" or "closed" condition is clearly controlled by the bleed rate of fluid into and out of the second chamber 34. This bleed rate is controlled by the location and size of the passages 46, 48 and ports 50.

Figure 6:
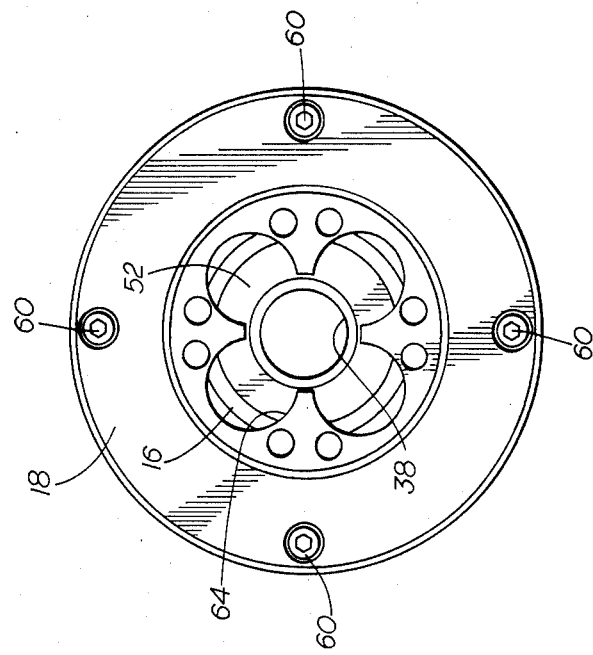
FIG. 6 is an end view of the alternate embodiment of FIG. 5.
Figure 5:
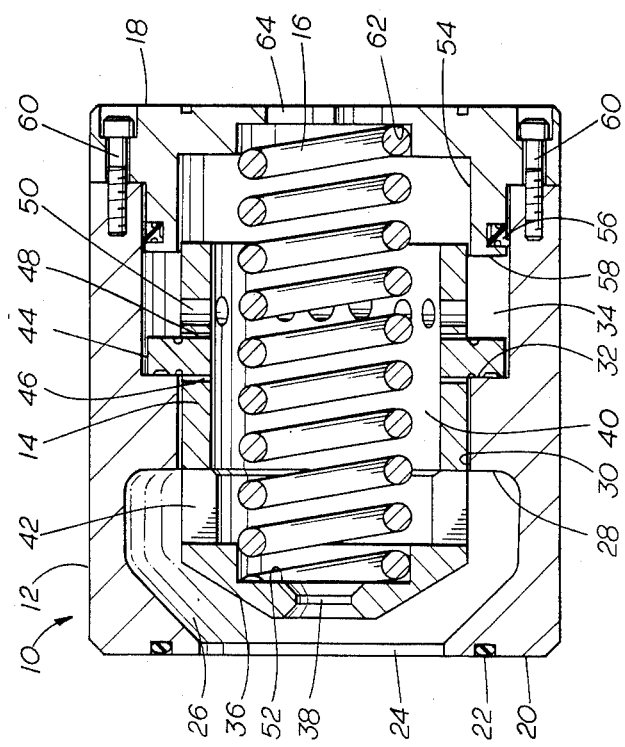
FIG. 5 is a longitudinal section through a first alternate embodiment of the present invention.

FIGS. 5 and 6 show an alternate embodiment of the present invention with like parts indicated by like reference numerals. The primary differences between this embodiment and the previously described preferred embodiment is in the shape of the body, retainer, and piston itself. Operation of this embodiment would be identical with that previously described.

It would also be possible to utilize the present invention in other configurations, for example, with a piston that has a substantial mushroom shape with a plate portion attached to the stem thereof controlling opening and closing of an annulus. In a fashion similar to the abovedescribed embodiments, a pair of inversely operating dashpots could control the movement of the mushroom shaped piston in either the opening or closing direction so that sudden changes in fluid velocity/pressure would not cause actuation of the valve and any movement of the valve will be dampened so as to prevent the occurrence of oscillations.

The present invention may be subject to many modifications and changes without departing from the spirit or essential characteristics thereof.

What is claimed is:

1. A control valve comprising:
   a body defining a fluid passage therethrough;
   a piston mounted for movement in said passage between first and second positions;
   a spring biasing said piston toward said first position;
   means defining a pair of inversely operating dashpots acting between said piston and said body whereby movement of said piston in either direction between said first and second positions is dampened to prevent sudden changes in flow rate and undesirable oscillations; and
   a retainer defining a central orifice and an annular insert received in said body to define a wall of one of said dashpots.

2. A control valve according to claim 1 wherein said body is a generally cylindrical member defining an entry port, a first chamber, an annular restriction and a second chamber.

3. A control valve according to claim 2 wherein said piston comprises a generally cylindrical member defining an axial chamber and having a flow engaging face on an upstream end of said member defining a central orifice, a plurality of radial orifices opening into said axial chamber, an outwardly directed integral annular flange intermediate the ends of said member, at least one bleed passage downstream of said flange and at least one radial passage on each side of said flange, said flange engaging in said second chamber of said body to define said pair of dashpots.

4. A control valve according to claim 3 wherein said spring is a helical spring and said piston and said retainer define opposed spaced spring receptacle surfaces.

5. A control valve according to claim 1 further comprising means to mount said valve in a closed fluid system.

6. A control valve having dampened operation to prevent sudden changes in flow rate and undesirable oscillations, said valve comprising:
   a body defining a fluid flow through passage having an inwardly directed annular flange intermediate the ends thereof dividing said passage into first and second chambers;
   a piston movable in said passage between first and second positions, said piston having a profiled end face with a central orifice opening into an axial throughchamber, at least one radial first port adjacent one end of said piston, at least one radial second port adjacent the other end of said piston, and an outwardly directed annular flange intermediate said first and second ports;
   a retainer secured to one end of said body and having a central orifice, an annular flange which extends into said second chamber to define with said annular flange on said body and said piston annular flange a pair of inversely acting dashpots; and
   a spring having a first end engaging said piston and a second end engaging said retainer to bias said piston to the first position;
   whereby said dashpots act against movement of said piston in either direction to prevent sudden changes in flow rate or oscillations.

7. A control valve according to claim 6 further comprising means for mounting said valve in a closed fluid system.

8. A control valve according to claim 7 wherein said mounting means included fluid sealing means.

9. A control valve according to claim 6 further comprising at least one passage to either side of said flange on said piston allowing fluid to bleed into and out of said axial chamber.

10. A control valve according to claim 6 further comprising sealing means between said body and said retainer.

11. A control valve according to claim 6 wherein said piston and said retainer each define a spring seat receiving a respective end of said spring.

12. A control valve according to claim 6 wherein said spring is a helical compression spring.

* * * * *